United States Patent
Sandkoetter

(10) Patent No.: US 9,982,921 B2
(45) Date of Patent: May 29, 2018

(54) COOLING SYSTEM FOR IN-TRANSIT COOLING

(75) Inventor: Wolfgang Sandkoetter, Herrenberg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 1705 days.

(21) Appl. No.: 11/868,606

(22) Filed: Oct. 8, 2007

(65) Prior Publication Data

US 2008/0083238 A1  Apr. 10, 2008

(30) Foreign Application Priority Data

Oct. 9, 2006 (DE) .................. 10 2006 048 821

(51) Int. Cl.
| F25B 49/02 | (2006.01) |
| F25B 27/00 | (2006.01) |
| B60H 1/00 | (2006.01) |
| B60H 1/32 | (2006.01) |
| F25D 29/00 | (2006.01) |

(52) U.S. Cl.
CPC ......... F25B 27/00 (2013.01); B60H 1/00428 (2013.01); B60H 1/3232 (2013.01); F25D 29/003 (2013.01); Y02T 10/88 (2013.01)

(58) Field of Classification Search
USPC .............................................. 62/323.1, 323.3
See application file for complete search history.

(56) References Cited

U.S. PATENT DOCUMENTS

| 2,786,334 | A | | 3/1957 | Wolf |
| 3,283,525 | A | | 11/1966 | Fricke et al. |
| 4,038,575 | A | * | 7/1977 | Nordebo ....................... 310/179 |
| 4,352,642 | A | * | 10/1982 | Murayama et al. .......... 417/312 |
| 4,748,824 | A | * | 6/1988 | Wakabayashi et al. ........ 62/239 |
| 4,991,400 | A | * | 2/1991 | Wilkinson ................... 62/228.4 |
| 6,463,749 | B2 | * | 10/2002 | Niimi ............................ 62/228.1 |
| 6,519,959 | B2 | * | 2/2003 | Kim et al. ...................... 62/211 |
| 6,530,426 | B1 | * | 3/2003 | Kishita et al. ................ 165/202 |
| 6,773,368 | B1 | * | 8/2004 | Williames ....................... 475/74 |
| 2004/0025525 | A1 | * | 2/2004 | Kubo et al. ..................... 62/230 |
| 2004/0187506 | A1 | * | 9/2004 | Iwanami et al. ................ 62/236 |

FOREIGN PATENT DOCUMENTS

| EP | 1 046 873 A1 | 10/2000 |
| EP | 1 512 565 A1 | 3/2005 |
| JP | 2005061697 A | 3/2005 |
| WO | WO 2002/090844 A1 | 11/2002 |

* cited by examiner

*Primary Examiner* — Christopher R Zerphey
(74) *Attorney, Agent, or Firm* — Reinhart Boerner Van Deuren P.C.

(57) ABSTRACT

In order to improve a cooling system, in particular for in-transit cooling, comprising a refrigeration circuit, in which a refrigerant compressor, a high-side heat exchanger, an expansion unit and a low-side heat exchanger are disposed, an electric compressor motor for driving the refrigerant compressor and a control unit for controlling a refrigerating output of the refrigeration circuit, in such a way that it operates as far as possible in an energy-saving manner, it is proposed that the cooling system has a generator for feeding electric power into an internal electrical supply system of the cooling system, from which the compressor motor is fed, and in that an internal combustion engine is provided for driving the generator.

24 Claims, 5 Drawing Sheets

COOLING SYSTEM FOR IN-TRANSIT COOLING

CROSS-REFERENCE TO RELATED PATENT APPLICATIONS

This patent application claims the benefit of German Application No. 10 2006 048 821.0, filed Oct. 9, 2006, the teachings and disclosure of which are hereby incorporated in their entirety by reference thereto.

BACKGROUND OF THE INVENTION

The invention relates to a cooling system, in particular for in-transit cooling of transportable containers or cooling cells of land vehicles, air or water craft, comprising a refrigeration circuit, in which a refrigerant compressor, a high-side heat exchanger, an expansion unit and a low-side heat exchanger are disposed, an electric compressor motor for driving the refrigerant compressor and a control unit for controlling a refrigerating output of the refrigeration circuit.

In the case of the known cooling systems, the compressor motor is either itself formed directly as an internal combustion engine or, if it is formed as an electric motor, is powered by an electrical system of the land vehicle, air or water craft. These known solutions are not of an energy-saving kind.

It is therefore an object of the invention to improve a cooling system of the generic type in such a way that it operates as far as possible in an energy-saving manner.

SUMMARY OF THE INVENTION

This object is achieved according to the invention in the case of a cooling system, in particular for in-transit cooling, by it comprising a refrigeration circuit in which a refrigerant compressor, a high-side heat exchanger, an expansion unit and a low-side heat exchanger are disposed, by it comprising an electric compressor motor for driving the refrigerant compressor and a control unit for controlling a refrigerating output of the refrigeration circuit, by the cooling system having a generator for feeding in electric power for an internal electrical supply system of the cooling system, from which the compressor motor is fed, and by the cooling system comprising an internal combustion engine for driving the generator.

The solution according to the invention makes it possible to operate the cooling system as far as possible in an energy-saving manner, individually in accordance with the respective conditions.

In particular, it is advantageous in this respect if a control unit is provided, controlling a rotational speed of the internal combustion engine by means of an engine controller.

This solution has the advantage that it provides energy-saving potential in a particularly simple way, since the internal combustion engine is only operated at the speed required to feed into the internal electrical supply system the electric power required for operating the cooling system, in particular the electric power required for operating the refrigerant compressor, or optionally also blower units.

It would in principle be conceivable in this respect to operate the internal electrical supply system as a direct-current system and to drive the generator at a higher speed to deliver greater power.

However, it is particularly advantageous if the generator is a three-phase generator.

Furthermore, it is advantageous if the internal electrical supply system is a three-phase system.

Finally, it is advantageous if the compressor motor is a three-phase motor.

In principle, it would be conceivable to allow the compressor motor to run at a specific speed or two specific speeds, and to feed into the internal electrical supply system the electric power corresponding to these speeds.

In such a case, it would then be advantageous if the compressor motor were provided with a variable-frequency drive, so that the speed of the compressor motor, and consequently the refrigerating output of the refrigeration circuit, could be adapted in steps, still better steplessly, to the refrigerating output actually required.

A particularly advantageous embodiment of the solution according to the invention provides that the generator and the compressor motor can be operated speed-proportionally in relation to one another, at least within a selected refrigerating output range.

That is to say that, within the selected refrigerating output range, there is a proportionality between the speed of the generator and the speeds of the compressor motor, so that regulating the speed of the compressor motor also allows the speed of the generator to be regulated.

The speed proportionality may be a strict speed proportionality; however, in the case where the compressor motor is an asynchronous motor, the proportionality may deviate from a strict proportionality ratio, since the asynchronous motor has a certain amount of slip. For this reason, the term "speed proportional" is not be interpreted as an exact proportionality value but as an approximate proportionality value for the purposes of the present invention.

The speed proportionality may be achieved in a wide variety of ways.

A particularly simple solution for achieving speed proportionality provides that the generator and the compressor motor can be operated such that they are coupled together in a frequency-proportional manner, at least within the refrigerating output range.

Both in the case of speed proportionality and in the case of frequency proportionality, it is conceivable within the scope of the solution according to the invention to provide a fixed proportionality factor, but it is also conceivable to provide different proportionality factors, for example for different refrigerating output ranges.

Consequently, there is for example the possibility of not choosing identical ranges for the range in which the internal combustion engine driving the generator can be optimally operated and the range that would be optimal for the compressor motor, so that the speed range in which the internal combustion engine, and consequently the speed of the generator via the speed of the internal combustion engine, can be advantageously controlled can be used in different refrigerating output ranges by providing different proportionality factors for the speed or frequency setting of the compressor motor.

In the simplest case, however, it is provided that the generator and the compressor motor run at the same frequency, so that the speed at which the generator is driven substantially corresponds to the speed at which the compressor motor runs.

A solution that is structurally particularly advantageous provides in this respect that the generator is a multi-pole generator and that the compressor motor has a number of poles corresponding to the frequency proportionality.

So, for example, it is conceivable to form the generator in such a way that it has half the number of poles as the compressor motor, so that in this case the compressor motor would then run at half the speed of the generator.

However, it is also conceivable to give both the generator and the compressor motor the same number of poles, so that then the two can be operated substantially frequency-proportionally to one another without further measures being taken.

Particularly advantageous control of the cooling system according to the invention is possible if the control unit controls the speed of the internal combustion engine at least within a selected refrigerating output range for controlling the refrigerating output of the refrigeration circuit.

The control unit could in this case operate in such a way that it provides different speeds, for example different speed steps, of the internal combustion engine and in each case selects a speed step.

However, to allow the refrigerating output to be controlled as exactly as possible in the refrigerating output range, it is particularly advantageous if the control unit can be used to control the refrigerating output substantially steplessly by steplessly controlling the speed of the internal combustion engine.

With regard to advantageous operation of the cooling system according to the invention, it is also advantageous if the cooling system has a blower unit for the high-side heat exchanger that is fed from the internal electrical supply system.

In particular if the internal supply system is designed as a three-phase system, the blower unit may be dependent on the frequency in the three-phase system.

For this reason, it is advantageous for controlling the blower unit independently of the supply system frequency if the blower unit can be operated via a converter unit.

Furthermore, it is preferably provided that the cooling system has a blower unit for the low-side heat exchanger that is fed from the internal electrical supply system.

To be able also to operate this blower unit independently of the frequency of the supply system, and consequently according to the required amount of air or gas, it is preferably provided that the blower unit is fed via a converter unit.

The converter units may in this case be inverters or pole-changing units.

In addition, an advantageous form of the cooling system according to the invention provides that the internal electrical supply system is provided with an in-feed unit for supplying electric power from an external supply system.

For security reasons, such an external supply system could for example also be the supply system for land vehicles, air and water craft.

However, such an external supply system is usually a stationary supply system, for example a supply system that is linked to a property or a supply system that is publicly accessible, such as for example a municipal supply system.

In particular, it is provided that the in-feed unit converts the frequency of the external supply system to a predeterminable frequency of the internal electrical supply system.

In the simplest case, the in-feed unit may be designed such that it operates directly at the frequency of the external supply system, and consequently the internal electrical supply system likewise operates at this frequency, since the electric power is fed in at this frequency.

However, it is also conceivable, in particular whenever the compressor motor is intended to run at a different frequency, that the predeterminable frequency of the internal electrical supply system deviates from that of the external supply system. In this case, a variable-frequency drive has to be provided between the external supply system and the internal electrical supply system.

With regard to the form of the compressor motor and the refrigerant compressor driven by it, a wide variety of solutions are conceivable. One solution provides that they can be separated from one another—for example by means of a clutch.

For reasons of simplicity of the construction, however, it is advantageous if the compressor motor and the refrigerant compressor are directly coupled in a mechanically rigid manner.

Such a direct mechanically rigid coupling may take place for example by means of an interposed gear mechanism.

However, a solution that is structurally even simpler is one in which the compressor motor and the refrigerant compressor have a common continuous shaft, which at one end is driven by the compressor motor and at the other end, in the refrigerant compressor, drives for example the eccentrics for driving the pistons if the compressor is formed as a piston compressor, or directly drives the orbiting spirals if the compressor is formed as a scroll compressor or spiral compressor.

To minimize refrigerant losses, it is also particularly advantageous if the compressor motor and the refrigerant compressor are disposed in a common, hermetically sealed housing.

This solution has the great advantage that it allows many sealing problems concerning the refrigerant compressor, and in particular in the region of the drive shaft of the refrigerant compressor, to be avoided.

A hermetically sealed housing can in this case be understood as meaning both a housing that is made up of a number of parts that are connected to one another in a sealed manner or a housing that is welded in a hermetically sealed manner.

Furthermore, further details have likewise not been provided with regard to the internal combustion engine and the generator motor.

It is also possible for example that these can be separated and connected to one another by means of a clutch.

For reasons of obtaining a construction that is as simple as possible, it has likewise proven to be advantageous if the internal combustion engine and the generator are directly coupled in a mechanically rigid manner.

Such a mechanically rigid coupling is for example likewise conceivably a coupling by means of an interposed gear mechanism. However, it is particularly simple if the internal combustion engine and the generator have a continuous shaft.

Furthermore, it is advantageous with regard to the assembly of the internal combustion engine and the generator if they form a unitary engine-generator unit.

It is still more advantageous if the internal combustion engine and the generator have a unitary housing unit.

However, the object according to the invention is not only achieved by a cooling system according to the features described above but also by a cooling facility, comprising a transportable cooling cell and a cooling system, the cooling system being formed according to the invention to correspond to one or more of the features described above.

Such a cooling facility is formed particularly advantageously if the cooling cell and the cooling system form a unitary transportable unit.

Further features and advantages of the solution according to the invention are the subject of the following description and the graphic representation of an exemplary embodiment.

DETAILED DESCRIPTION OF THE INVENTION

Figure 1:
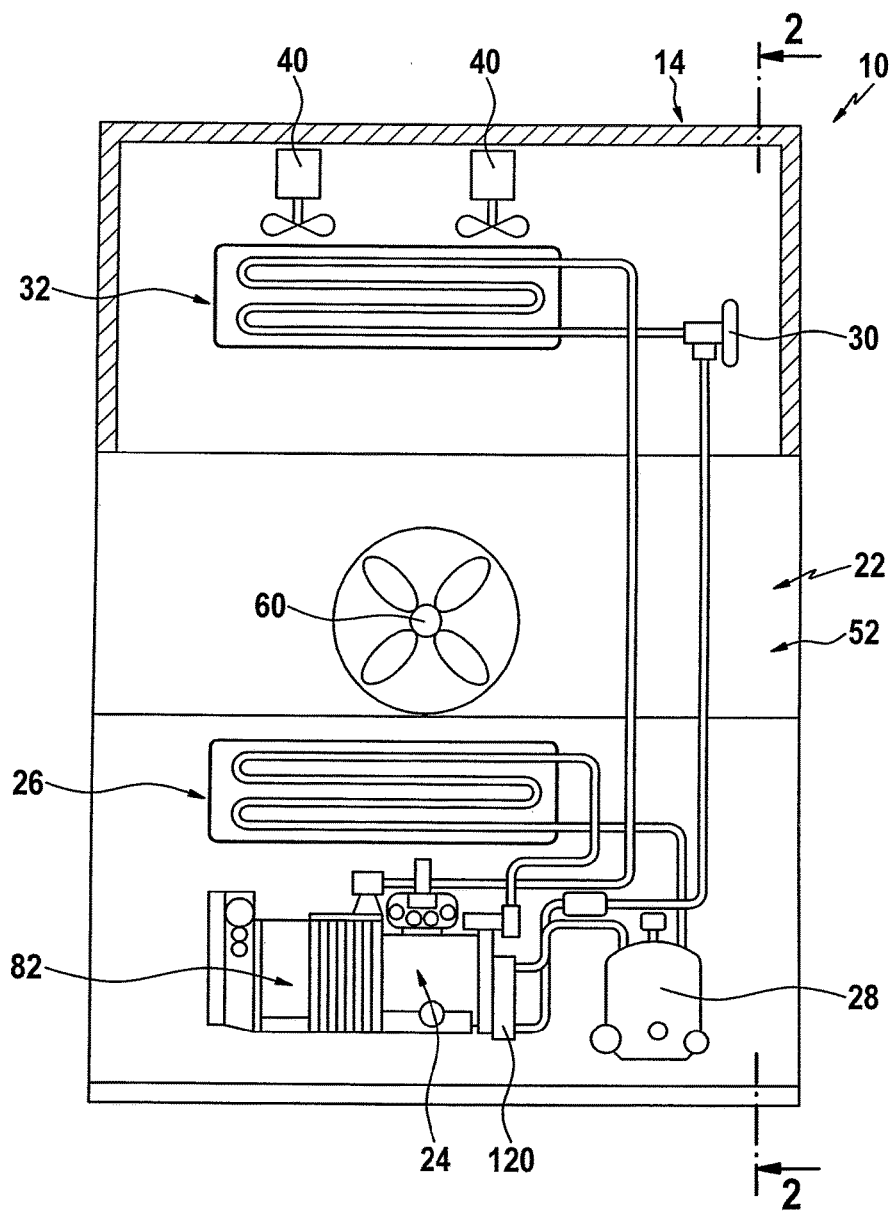
FIG. 1 shows a section along line 1-1 in FIG. 2 through a cooling container with a first exemplary embodiment of a cooling system according to the invention.
Figure 2:
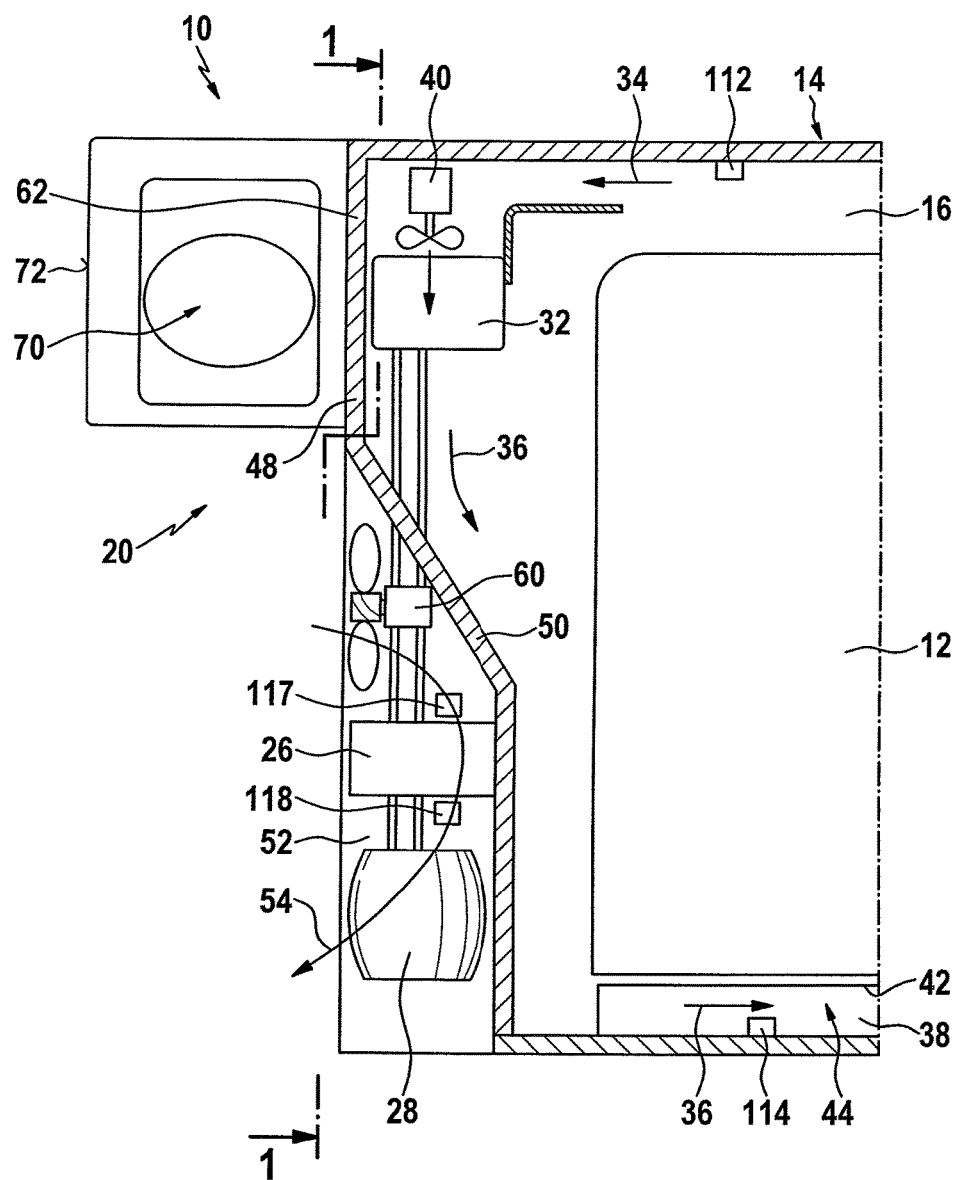
FIG. 2 shows a section along line 2-2 in FIG. 1.

A cooling container which is designated as a whole by 10 and is intended for transporting perishable products 12, such as for example frozen fish, chilled meat, fruit, chocolate or cut flowers, comprises as a cooling cell a thermally insulated container housing 14, in which there is provided a transporting volume 16 that can be cooled by a first exemplary embodiment of a cooling system designated as a whole by 20.

The cooling system 20 comprises a refrigeration circuit, which is designated as a whole by 22 and in which there is located a refrigerant compressor 24, which compresses refrigerant to high pressure and feeds it to a high-pressure-side heat exchanger 26, for example a condenser, in which cooling of the highly pressurized refrigerant takes place in the usual way and preferably its enthalpy is lowered. In the case of customary refrigerants, condensation takes place, so that liquid refrigerant collects in a collector designated as a whole by 28.

From this collector 28, liquid refrigerant is removed either directly or via an optionally connectable economizer and fed to an expansion unit 30, which makes the highly pressurized liquid refrigerant expand and then enter a low-pressure-side heat exchanger 32, for example also referred to as an evaporator.

The refrigerant heated up again in the low-side heat exchanger 32 is then sucked in again by the refrigerant compressor 24 and compressed in the way described.

The low-side heat exchanger 32 is then able to cool an air or gas stream 34, which is sucked out of the transporting volume 16 and blown through the low-side heat exchanger 32 by a blower unit 40, so that a cooled air or gas stream 36 leaves the low-side heat exchanger 32 and returns into the transporting volume, for example via a cooling duct 38 at the bottom, and is distributed in the transporting volume.

The cooling duct 38 at the bottom may be formed for example by T-bars 42, which form a bottom assembly 44 of the container housing 14.

For the high-side heat exchanger 26 and the refrigerant compressor 24 to be suitably disposed in the container housing 14, a front wall 48 of the container housing 14 is provided with a set-back wall region 50, so that a space 52 for receiving the high-side heat exchanger 26 and the refrigerant compressor 24 is created at the front of the wall region 50.

The space 52 is flowed through by a cooling air stream 54, which is produced by means of a blower unit 60 and is directed at the high-side heat exchanger 26, so that it flows through the high-side heat exchanger 36 in order to cool the highly pressurized refrigerant.

Also mounted on the container housing 14, preferably on an upper wall region 62 of the front wall 48, is an engine-generator unit 70, which is disposed in an engine-generator housing 72.

Figure 3:
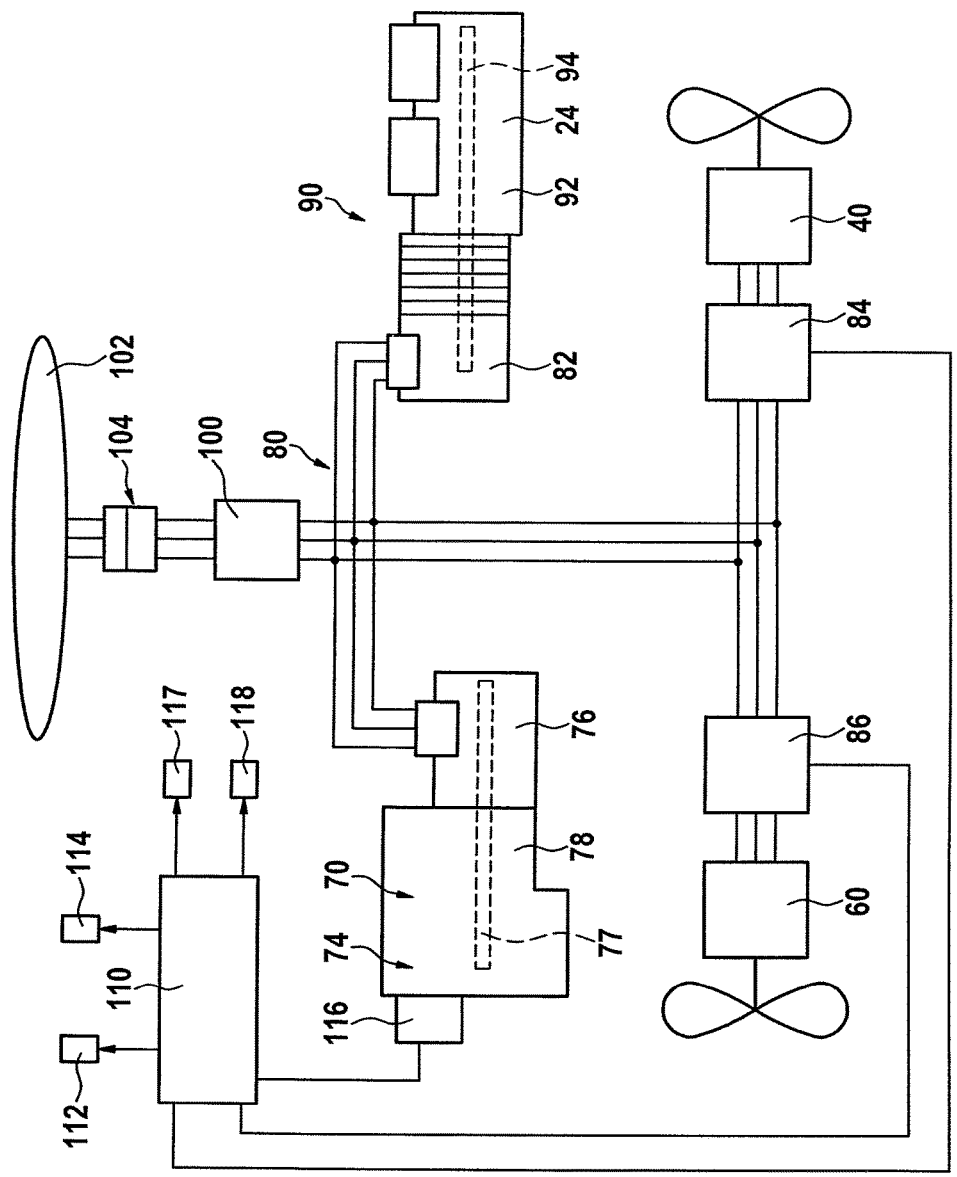
FIG. 3 shows a schematic representation of a drive of a refrigeration circuit of the first exemplary embodiment of the cooling system according to the invention with an internal electrical supply system.

As represented in FIG. 3, the engine-generator unit 70 comprises an internal combustion engine 74, preferably a diesel engine, which drives an electrical generator 76 coupled to it.

The internal combustion engine 74 and the electrical generator 76 are preferably flange-mounted directly on one another and coupled to one another in a mechanically rigid manner by means of a continuous shaft, and consequently form a unit provided in a common housing block 78.

The electrical generator 76 driven by the internal combustion engine 74 feeds an internal electrical supply system 80 with electric power, among the units that are connected to the internal electrical supply system 80 being an electric compressor motor 82, which drives the refrigerant compressor 24 and is directly connected to it to form a motor-compressor unit 90.

In particular, the compressor motor 82 and the refrigerant compressor 24 are coupled to one another in a mechanically rigid manner, for example by a continuous shaft 94, and have a common hermetically sealed housing 92.

Furthermore, the blower unit 40 is also connected to the internal electrical supply system 80, to be precise via a converter unit 84.

Moreover, the blower unit 60 is also connected to the internal electrical supply system 80 via a converter unit 86.

The converter units 84 and 86 may in this case be formed as controllable inverters or as controllable pole-changing devices, so that the rotational speed or frequency at which the blower units 40, 60 are operated can be set independently of the frequency of the internal electrical supply system 80.

Furthermore, in particular for operating the cooling system 20 at a standing or storing location, the internal electrical supply system 80 is connected to an in-feed unit 100, which makes it possible to feed electric power to the internal electrical supply system 80 from an external supply system 102, for example a stationary supply system, as found in properties and for example also possibly in the form of a public supply system, the connection of the in-feed unit 100 to such an external stationary supply system 102 being made by means of a plug-in connection 104, to be precise whenever the container or transporting body is not in transit but stationary, for example left at a parking lot or a storage facility.

For controlling the refrigerating output delivered by the refrigeration circuit 22 at the low-side heat exchanger 32, a control unit designated as a whole by 110 is provided and determines the temperature conditions in the transporting volume 16, for example by means of temperature sensors 112, which are surrounded by the flow of the air or gas stream 34 sucked in from the transporting volume 16, and by means of temperature sensors 114, which are surrounded by the flow of the cooled air or gas stream 36, and compares said conditions with, for example, previously stored desired values for the temperature.

On the basis of this comparison of the temperatures with desired values, control signals are generated for the cooling system according to the invention.

A significant controlled variable for the obtainable refrigerating output at the heat exchanger 32 is in this case the rotational speed at which the refrigerant compressor 24 is driven by the electric compressor motor 82.

As far as the control unit 110 is concerned, in the case of the first exemplary embodiment there is no direct speed control of the electric compressor motor 82, at least in a selected refrigerating output range, but instead a control unit 116 is used, for example an injection controller in the case of a diesel engine, to control the speed of the internal combustion engine 74, and consequently also control the speed of the electrical generator 76, which consequently provides the electric power at different frequencies on the basis of its speed dependence.

For example, the electrical generator 76 is operated at speeds between approximately 1000 rpm and approximately 3600 rpm.

Furthermore, the generator 76 is constructed in such a way that, if it is operated at approximately 1000 rpm, the electric power is fed into the internal electrical supply system 80 at a frequency of approximately 33 Hz, and if it is operated at approximately 3600 rpm, the electric power is fed into the internal electrical supply system 80 at a frequency of approximately 120 Hz.

Consequently, for example, the frequency at which the electric power is fed into the internal electrical supply system 80 by the electrical generator 76 lies in the range from approximately 33 Hz to approximately 120 Hz.

The internal electrical supply system 80 is consequently fed in a frequency-variable manner by the speed-variably operated electrical generator 76, and is consequently also operated in a frequency-variable manner.

Correspondingly, the compressor motor 83 is also fed in a frequency-variable manner and runs at a speed proportional to the frequency of the internal electrical supply system 80.

In the simplest case, the electrical generator 76 is constructed in such a way that its number of poles corresponds to the number of poles of the compressor motor 82, and consequently the speed of the compressor motor corresponds substantially to the speed of the generator 76—disregarding slip in the case of an asynchronous motor.

By contrast with the known cooling systems, in the case of the cooling system 20 according to the invention there is consequently no electrical regulation of the speed of the compressor motor 82 in the selected refrigerating output range, but instead the speed regulation of the compressor motor 82 is ultimately performed on the basis of the speed regulation of the internal combustion engine 74.

In order also to have the possibility of being able to operate the blower units 40 and 60 by the internal electrical supply system 80 independently of the speed of the generator 76 and the speed of the compressor motor 82, the converter units 84 and 86 are provided, allowing the blower units 40 and 60 to be operated at a frequency other than that of the internal electrical supply system 80 at the speeds respectively required for circulating the air or gas stream 34, 36 and circulating the cooling air stream 54.

Control of the speed of the blower units 40 and 60 is in this case likewise effected by means of the control unit 110, which supplies the controllable converter units 84 and 86 with corresponding control signals.

For this purpose, the control unit 110 preferably also additionally records the temperatures of the air flow 54 before it enters the high-side heat exchanger 26 and after it leaves the high-side heat exchanger 26, by means of sensors 117 and 118.

Figure 4:
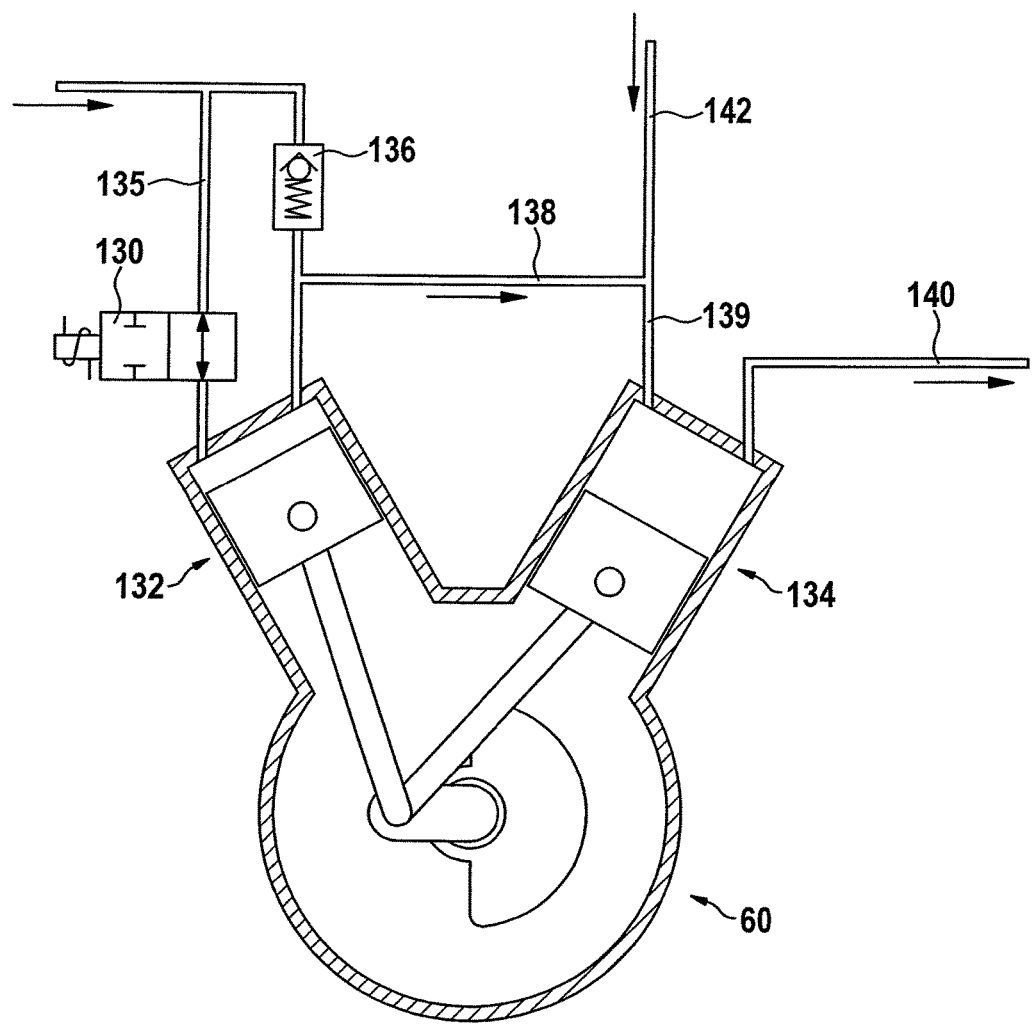
FIG. 4 shows a schematic representation of a two-stage refrigerant compressor according to the exemplary embodiment of the cooling system according to the invention and FIG. 5 shows a schematic representation corresponding to FIG. 3 of a second exemplary embodiment of the cooling system according to the invention.

However, controlling the refrigerating output is not performed exclusively by means of controlling the speed of the compressor motor 82, but also by the control unit 110 itself switching a known economizer stage 120 on or off or else additionally switching a first of two compressor stages 132 and 134 of the refrigerant compressor 24 on or off by means of activating an on/off valve 130, as represented in FIG. 4.

By means of the on/off valve 130, a suction line 135 of the first compressor stage 132 can be blocked and, by means of a non-return valve 136 and a bypass line 138, the refrigerant that is in fact flowing to the first compressor stage 132 is sucked in directly by the suction line 139 of the second compressor stage 134, which then conveys the compressed refrigerant to the high-side heat exchanger 32 via a high-pressure line 140. Furthermore, also leading to the suction line 139 of the second compressor stage 134 is a suction line 142 of the economizer 120, so that the refrigerant flowing through the latter is only ever sucked in by the second compressor stage 134, irrespective of whether both compressor stages 132 and 134 are operating or only one of the compressor stages, namely the second compressor stage 134, is operating.

Such operation of a multistage refrigerant compressor 24 in different operating modes and for different required refrigerating outputs is for example described in detail in WO 02/090844 A1, to the full content of which reference is made with regard to optimized operation of the refrigerant compressor 24 in a wide variety of operating states.

However, by contrast with the solution according to WO 02/090844 A1, the speed of the compressor motor 82 is controlled by the control unit 110 in a variably controllable refrigerating output range in speed steps or steplessly in the way described.

Figure 5:
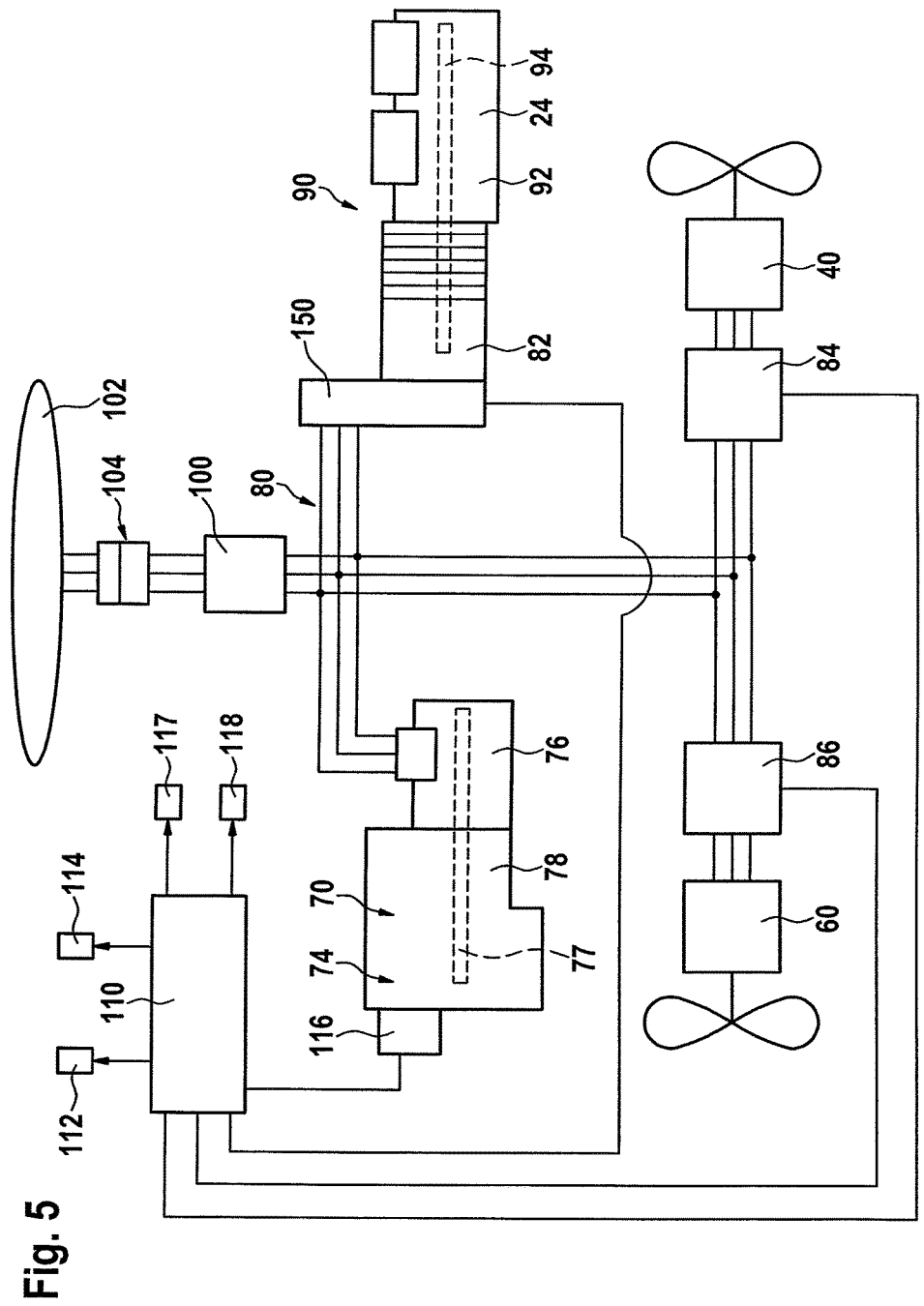

Since, however, the controllable speed range of the internal combustion engine 74 is smaller than the speed range in which the refrigerant compressor 24 can preferably be operated for controlling the refrigerating output, a second exemplary embodiment of a cooling system 20 according to the invention, represented in FIG. 5, provides the possibility of also additionally feeding the compressor motor 82 via the internal electrical supply system 80 by means of a variable-frequency drive 150.

Consequently, in the case of frequency-proportional operation of the compressor motor 82 and the generator 76, different proportionality factors can be predetermined, so that, while utilizing the same speed range of the internal combustion engine 74, a different proportionality factor between the generator 76 and the compressor motor 82 is used for example for the controlled operation of the refrigeration circuit 22 in a lower refrigerating output range than for the controlled operation of the refrigeration circuit 22 in an upper refrigerating output range.

In the case of the second exemplary embodiment, however, there would also be the possibility of operating the internal combustion engine 74 in a stepped manner, in individual speed steps, and of performing the fine regulation of the speed of the refrigerant compressor 24 by activating the variable-frequency drive 150 via the control unit 110. This solution would have the advantage that the internal combustion engine 74 could be operated at precisely the speeds at which it operates optimally from the consumption side and from the exhaust side, and there is nevertheless the possibility of being able to set the speed of the refrigerant compressor 24 steplessly by means of the control unit 110 and the variable-frequency drive 150.

In addition, it would also be possible in the case of this embodiment to adapt the operation of the blower units 40 and 60, for example by suitable choice of the number of poles of the electric motors, to this extent to the individual operating speeds of the internal combustion engine 74, so that there may be no need for converter units 84 and 86, if no fine control is required, in particular no stepless fine control of the blower units 40 and 60.

The invention claimed is:

1. Cooling system for in-transit cooling, comprising a refrigeration circuit, in which a refrigerant compressor, a high-side heat exchanger, an expansion unit and a low-side heat exchanger are disposed, the cooling system having a generator for feeding electric power into an internal electrical supply system of the cooling system, from which an electric compressor motor is fed for driving the refrigerant compressor, an internal combustion engine for driving the generator, a control unit for controlling a refrigerating output of the refrigeration circuit wherein the control unit controls a rotational speed of the internal combustion engine by means of an engine controller operating the internal combustion engine only at the rotational speed required to feed into the internal electrical supply system the electrical power required for operating the cooling system.

2. Cooling system according to claim 1, wherein the generator is a three-phase generator.

3. Cooling system according to claim 1, wherein the internal electrical supply system is a three-phase system.

4. Cooling system according to claim 1, wherein the compressor motor is a three-phase motor.

5. Cooling system according to claim 1, wherein the generator and the compressor motor are configured to be operated speed-proportionally in relation to one another, at least within a refrigerating output range.

6. Cooling system according to claim 5, wherein the generator and the compressor motor are configured to be operated such that they are coupled together in a frequency-proportional manner, at least within the refrigerating output range.

7. Cooling system according to claim 6, wherein the generator and the compressor motor are configured to run at the same frequency.

8. Cooling system according to claim 7, wherein the generator is a multi-pole generator and in that the compressor motor has a number of poles corresponding to the frequency proportionality.

9. Cooling system according to claim 1, wherein the control unit is configured to control the speed of the internal combustion engine at least within a refrigerating output range for controlling the refrigerating output of the refrigeration circuit.

10. Cooling system according to claim 9, wherein the control unit is configured to control the refrigerating output steplessly by controlling the speed of the internal combustion engine.

11. Cooling system according to claim 1, wherein the cooling system has a blower unit associated with the high-side heat exchanger, and the blower unit is fed from the internal electrical supply system.

12. Cooling system according to claim 11, wherein the blower unit is fed from the internal electrical supply system via a converter unit.

13. Cooling system according to claim 1, wherein the cooling system has a blower unit associated with the low-side heat exchanger and the blower unit is fed from the internal electrical supply system.

14. Cooling system according to claim 13, wherein the blower unit is fed from the internal electrical supply system via a converter unit.

15. Cooling system according to claim 1, wherein the internal electrical supply system is provided with an in-feed unit for supplying electric power from an external supply system.

16. Cooling system according to claim 15, wherein the in-feed unit converts a frequency of the external supply system to a predeterminable frequency of the internal electrical supply system.

17. Cooling system according to claim 1, wherein the compressor motor and the refrigerant compressor are directly coupled in a mechanically rigid manner.

18. Cooling system according to claim 1, wherein the compressor motor and the refrigerant compressor are disposed in a common, hermetically sealed housing.

19. Cooling system according to preceding claim 1, wherein the internal combustion engine and the generator are directly coupled in a mechanically rigid manner.

20. Cooling system according to claim 1, wherein the internal combustion engine and the generator form a unitary engine-generator unit.

21. Cooling system according to claim 20, wherein the internal combustion engine and the generator have a unitary housing unit.

22. Cooling facility comprising a transportable cooling cell, and a cooling system for in-transit cooling, said cooling system comprising a refrigeration circuit, in which a refrigerant compressor, a high-side heat exchanger, an expansion unit and a low-side heat exchanger are disposed, an electric compressor motor for driving the refrigerant compressor and a control unit for controlling a refrigerating output of the refrigeration circuit, the cooling system having a generator for feeding electric power into an internal electrical supply system of the cooling system, from which the compressor motor is fed, and an internal combustion engine for driving the generator, a rotational speed of the internal combustion engine and generator being regulated by the control unit to control the refrigeration output, the internal combustion engine and generator being dedicated to the transportable cooling cell, and thereby separate from an engine that mobilizes a land vehicle, aircraft or watercraft.

23. Cooling facility according to claim 22, wherein the cooling cell and the cooling system form a unitary transportable unit.

24. The cooling facility according to claim 23, wherein the internal electrical supply system is provided with an in-feed unit for supplying electric power from an external supply system.

* * * * *